May 16, 1961 R. MALLEBREIN 2,984,790

ELECTRONIC STORAGE SYSTEM

Filed Dec. 18, 1958 2 Sheets-Sheet 1

Inventor:
RAINER MALLEBREIN
BY [signature]
PATENT AGENT

May 16, 1961 R. MALLEBREIN 2,984,790

ELECTRONIC STORAGE SYSTEM

Filed Dec. 18, 1958 2 Sheets-Sheet 2

INVENTOR:
RAINER MALLEBREIN

BY [signature]

PATENT AGENT

United States Patent Office 2,984,790

Patented May 16, 1961

2,984,790

ELECTRONIC STORAGE SYSTEM

Rainer Mallebrein, Singen, Hohentwiel, Germany, assignor to Telefunken G.m.b.H., Berlin, Germany Filed Dec. 18, 1958, Ser. No. 781,314

5 Claims. (Cl. 328—124)

The present invention relates to electronic storage systems used to record pulse sequences which are periodically repeated and which change relatively slowly during their cycle of repetition, the sequences of pulses being recorded in the storage means and reproduced therefrom during a read-out scanning period which is longer than the recording period. Such systems can be used, for example, for compressing the frequency band width of television signals or of received radar signals. The storage system, generally, comprises a plurality of electrostatic or electromagnetic storage elements.

If new pulses are recorded in such a storage system simultaneously with the read-out scanning operation, or at least during a portion of the scanning period, this may cause disturbances in the output signals. Such disturbances occur, for example, in storage systems with electronic storage tubes, because a common load resistance is employed in such cases for the recording and the scanning circuits. The disturbances however are not limited to storage tube systems.

Methods and systems have been proposed to avoid the disturbances caused by the simultaneous recording. These known proposals are relatively costly and complex and are only partially effective. For example, it is possible to derive a compensation signal from the recorded signal and to feed said compensation signal with a suitable polarity to the output of the storage system. However, such method requires a degree of linearity of the storage means which can be fulfilled only in special cases.

It is an object of the present invention to avoid disturbances in the output signals of a storage system, said disturbances resulting from simultaneous recording in the storage means during at least a part of the read-out scanning period. The invention solves this problem relatively economically and is not subject to the same limitations of applicability as the aforementioned compensation method.

It is another object of the invention to provide in an electronic storage system means adapted to block the delivering of a new signal to be recorded on the storage means for the brief interval during which a signal in the form of a scanned pulse appears at the output of the storage means.

It is a further object of the invention when applied to electronic storage tube systems employing recording and scanning, to derive a signal of suitable polarity and amplitude from each pulse appearing at the output of the tube, and to feed said derived signal back into the recording system in such a manner that the recording beam is interrupted during the duration of the derived signal.

It is an object of a modified form of the invention to block the recording amplifier rather than the recording beam of the tube.

It would appear that, by the application of the invention, the occurrence of said recording disturbances in the output signal of the storage system is prevented but that, simultaneously, a loss of intelligence of communication occurs which cannot be made up, due to the gaps which are caused in the recording continuity. This would be true if the duration of the read-out period of scanning were to equal the period of recording which, however, is not true. If, as supposed, the read-out period is longer, particularly if it amounts to a multiple of the recording period, wherein one read-out period corresponds to several recording periods added together, then the gaps occurring in the scanned pulses always occur at different places in the successive recording and read-out operations. The conditions are particularly favorable when the invention is applied to storage systems employing frequency band compression of received radar signals, because in such cases, the pulse density per measured interval is small on the average. In view of statistical considerations, where a plurality of lines are scanned, the occasional blanking of a recording pulse received while scanning a pulse will not noticeably impair the composite output.

The mutual complementing of successive, partially blanked recording lines quickly obliterates the defects of each line, especially when the storage system has such a characteristic that the storage efficiency, defined by the ratio of the read-out signal amplitude to the number of successively stored input pulses, decreases with increasing number of stored pulses, as it frequently occurs in practice. Obviously, the invention can also be applied to storage means with strictly linear characteristics. However, in this case, the complementary combining effect occurring in the storage means must extend over a larger number of recording lines so as to satisfactorily decrease the defects caused by the blanking described.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
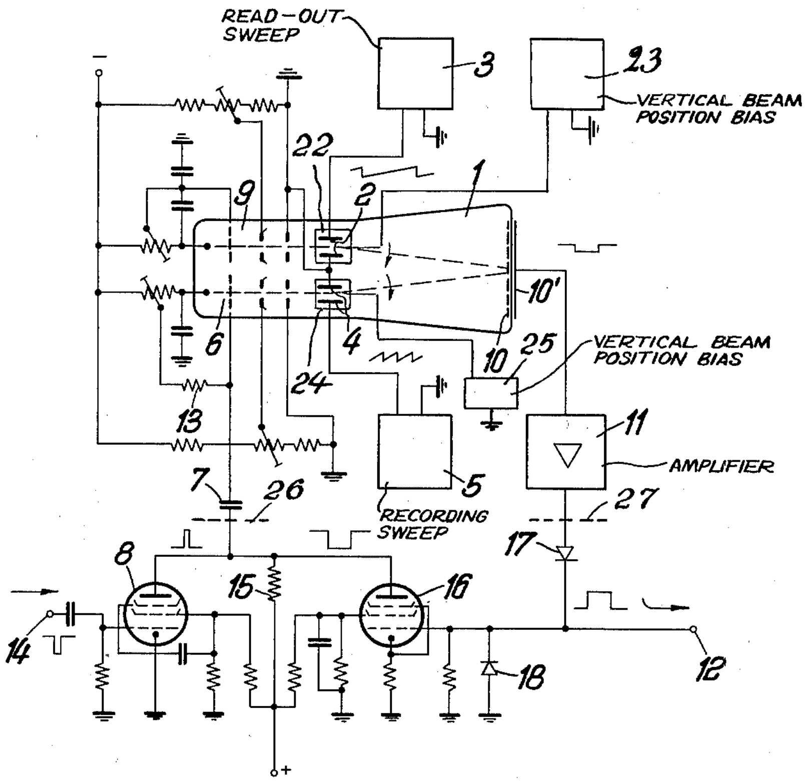
Figure 1 illustrates schematically a circuit diagram of an electronic storage system according to the invention, suitable for frequency band compression, for example, of received radar signals.

The storage system shown in the drawing comprises a storage tube 1 having two separate beams, of which the upper beam serves for read-out scanning while the lower beam is used for recording. Accordingly, upper deflection plates 2 are connected in a manner known per se to a deflection sweep generator 3 for read-out scanning, while lower deflection plates 4 are connected to a deflection sweep generator 5 used for recording. The repetition rate frequencies of the sweep voltages produced in these generators have, for example, the ratio 1:6. Thus, the read-out scanning period is six times as long as the recording period, so that, during each read-out period, the charges stored by six recording periods on the storage line are scanned. For the sake of illustration, the deflection plates 2 and 4 will be referred to as "horizontal" deflection plates, and another two sets of deflection plates 22 and 24, employed to adjust the beams in the direction perpendicular to the plane of the drawing, will be referred to as the "vertical" deflection plates. The deflection of the beams by the vertical deflection plates 22 and 24 is effected by means of adjustable constant biases such as to cause the traces scanned by the two electron beams to coincide at the storage line. These pairs of deflection plates 22 and 24 are illustrated in the drawing with one plate in each pair omitted, in order to avoid crowding of the figure.

The deflection plates 22 and 24 are connected to adjustable bias means 23 and 25, respectively. The remaining electrodes of the storage tube which are not specifically referred to are connected to suitable operating voltages in a manner known per se. A control grid 6 of the recording system is connected to the output of a tube 8 of the recording amplifier via a condenser 7 and connected to a bias voltage via a resistance 13, while a control grid 9 of the read-out scanning means is connected to a suitable constant bias potential. A signal pickup electrode 10' cooperating with a storage layer 10 is connected in a conventional manner to the input of a read-out amplifier 11, the output of which is connected to an output terminal 12 of the storage system.

The signal to be stored is fed in the form of negative pulses to the grid of the tube 8 via an input terminal 14. Therefore, pulses having positive polarity appear at the load resistance 15 of this tube, said pulses being fed to the grid 6 of the recording system of the storage tube 1 via the condenser 7 and modulating the intensity of the recording beam correspondingly. However, this recording step is prevented, in accordance with this invention, when the read-out beam supplied during the read-out scanning period across the storage line impinges on a recorded pulse, i.e., when a read-out signal appears at the output electrode 10' of the tube, no input pulse is recorded.

For this purpose, the control grid of a tube 16 is connected to the output of the scanning amplifier 11, whereby diodes 17 and 18 serve to block negative signals coming from the recording beam and serve to adjust the average potential level. The tube 16 acts on the same load resistance 15 as the tube 8. Therefore, if a positive read-out pulse is received at the grid of the tube 16, the latter produces a negative pulse at the resistance 15, said pulse blocking the recording beam of the storage tube 1 via the condenser 7. Thus, modulation of the recording beam by input pulses simultaneously received via the tube 8 is prevented during the duration of a negative blocking pulse, said duration equalling the duration of the output pulse at the terminal 12.

As mentioned in the foregoing, according to a modified form of the invention, the recording amplifier itself rather than the recording beam of the storage tube can be blocked during occurrence of an output pulse at 12. To obtain an embodiment of this modified form, in the arrangement of Fig. 1 merely the lower part comprising tubes 8 and 16, below the dashed lines 26 and 27, has to be replaced by a circuit shown in Fig. 2.

Figure 2:
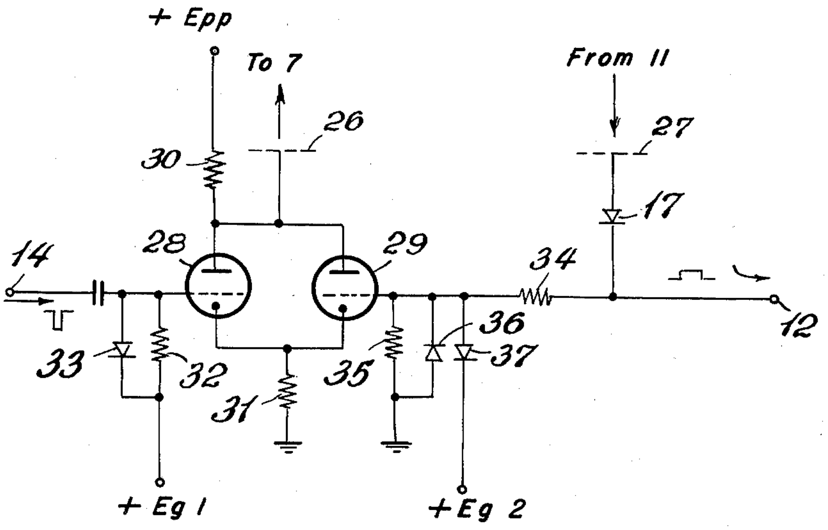
Figure 2 illustrates the circuit of an electronic switch usable with that part of the circuit of Figure 1 which appears above the dashed lines 26 and 27.

This circuit of Fig. 2, well known in the art per se, constitutes an electronic switch comprising an amplifier triode 28 and a switching or blocking triode 29 which have a common plate or load resistor 30 and a common cathode resistor 31 connected to a plate voltage $+E_{pp}$ and the ground potential respectively. The output signal of tube 28 is fed to condenser 7 as in Fig. 1. The control grid of tube 28, to which the input pulses are supplied at 14, is connected to a bias $+E_{g1}$ via a resistor 32 and a D.C.-restoring diode 33. The output of the scanning amplifier 11 (Fig. 1) is fed to the control grid of tube 29 via a resistor 34, said grid being connected to ground potential via a resistor 35 and a clamping diode 36 and connected to a bias $+E_{g2}$ via a clamping diode 37. The bias voltages $+E_{g1}$ and $+E_{g2}$ are chosen as to yield working of tubes 28 and 29 as follows.

If no read-out signal coming from amplifier 11 is present at the output terminal 12 and at the control grid of tube 29, tube 28 is in a condition of operation to deliver an amplified input signal to control grid 6 of storage tube 1 via the condenser 7 (Fig. 1). Its current over resistor 31 generates a positive potential at both cathodes which causes tube 29 to be blocked. If however a positive read-out signal is fed to the control grid of tube 29, this tube is unblocked and takes over the current formerly carried by tube 28, while the last becomes blocked due to the higher potential now appearing at both cathodes. Tube 28 therefore is unable to deliver any input signal to the control grid of storage tube 1, as long as a read-out signal is supplied by the amplifier 11.

It is understood that some other modifications may be realized, for instance pentodes and their appropriate circuit elements may be chosen instead of the triodes 28 and 29 and the elements described, without departing from the spirit or the scope of the invention.

I claim:

1. An electronic storage system for recording and reading out slowly changing sequences of periodically recurring pulses, comprising a storage medium on which said pulse sequences are recorded; a recording means; periodic sweeping means for causing said recording means to traverse said medium at a periodic rate equal to that of said sequences; read-out means associated with an output terminal; scanning means for causing said read-out means to scan said medium at another periodic rate covering a longer interval of time than the interval of each recording sweep and said longer interval including at least a portion of the recording period; and automatic blocking means connected to the output of said read-out means and actuated by the presence of a pulse thereat and for the duration of each output pulse to block the recording of input pulses which would otherwise be recorded simultaneously on said medium.

2. In a system as set forth in claim 1, said storage medium comprising an electronic storage tube including a storage layer, electrode means for generating a recording beam comprising said recording means and a separate readout beam comprising said read-out means and both beams converging on the same line of the storage layer; and said blocking means when actuated by the presence of an output pulse delivering a potential to said electrode means to interrupt said recording beam.

3. In a system as set forth in claim 2, an amplifier connected to receive the sequence of pulses applied to the system, and connected to modulate said recording beam; and said blocking means delivering said potential to said amplifier in such amplitude and polarity as to block said recording beam.

4. In a system as set forth in claim 3, said amplifier having a load resistance connected to control said electrode means; and said blocking means comprising an amplifier stage shunted across the same load resistance and driving it in the direction to cut off said beam.

5. In a system as set forth in claim 1, said storage medium comprising an electronic storage tube including a storage layer, electrode means for generating a recording beam comprising said recording means and a separate read-out beam comprising said read-out means and both beams converging on the same line of the storage layer; an amplifier connected to receive the sequence of pulses applied to the system, and connected to modulate said recording beam; and said blocking means when actuated by the presence of an output pulse delivering a potential to said amplifier in such amplitude and polarity as to block the delivering of input pulses to the electrode means of the recording beam.

References Cited in the file of this patent

UNITED STATES PATENTS

| | | |
|---|---|---|
| 2,547,638 | Gardner | Apr. 3, 1951 |
| 2,745,985 | Lewis | May 15, 1956 |
| 2,770,747 | Jensen | Nov. 13, 1956 |
| 2,802,138 | Tompkins | Aug. 6, 1957 |
| 2,807,005 | Weidenhammer | Sept. 17, 1957 |
| 2,850,667 | Williams | Sept. 2, 1958 |

UNITED STATES PATENT OFFICE

CERTIFICATE OF CORRECTION

Patent No. 2,984,790 May 16, 1961

Rainer Mallebrein

It is hereby certified that error appears in the above numbered patent requiring correction and that the said Letters Patent should read as corrected below.

In the heading to the printed specification, between lines 5 and 6, insert:

Claim priority, application Germany December 24, 1957

Signed and sealed this 10th day of October 1961.

(SEAL)
Attest:

ERNEST W. SWIDER
Attesting Officer

DAVID L. LADD
Commissioner of Patents

USCOMM-DC

UNITED STATES PATENT OFFICE
CERTIFICATE OF CORRECTION

Patent No. 2,984,790 May 16, 1961

Rainer Mallebrein

It is hereby certified that error appears in the above numbered patent requiring correction and that the said Letters Patent should read as corrected below.

In the heading to the printed specification, between lines 5 and 6, insert:

Claim priority, application Germany December 24, 1957

Signed and sealed this 10th day of October 1961.

(SEAL)
Attest:

ERNEST W. SWIDER
Attesting Officer

DAVID L. LADD
Commissioner of Patents

USCOMM-DC